United States Patent [19]

Wallace

[11] 4,147,219

[45] Apr. 3, 1979

[54] TWO-SPEED OFFSET NUTRUNNER

[75] Inventor: William K. Wallace, Barneveld, N.Y.

[73] Assignee: Chicago Pneumatic Tool Company, New York, N.Y.

[21] Appl. No.: 853,497

[22] Filed: Nov. 21, 1977

[51] Int. Cl.$^2$ .......... B23Q 5/027

[52] U.S. Cl. .......... 173/12; 173/163

[58] Field of Search .......... 173/12, 20, 163; 81/52.4, 52.5

[56] References Cited

U.S. PATENT DOCUMENTS

| | | | |
|---|---|---|---|
| 3,507,173 | 4/1970 | Wallace | 81/52.4 |
| 3,517,574 | 6/1970 | Glatfelter | 173/163 |
| 3,529,513 | 9/1970 | Amtsberg | 173/12 |
| 3,584,694 | 6/1971 | Wallace | 173/20 |
| 3,827,510 | 8/1974 | Mazepa | 173/163 |
| 3,915,034 | 10/1975 | Ward | 173/163 |

*Primary Examiner*—Robert A. Hafer
*Attorney, Agent, or Firm*—Stephen J. Rudy

[57] ABSTRACT

A two-speed pneumatically powered rotary nut runner having an auxiliary motor, and a main motor axially offset from the auxiliary motor and being drivingly connected thereto by a reduction gear cage. An output spindle is provided for engagement with a drive shank for setting of a threaded fastener, and an intermediate spindle, drivingly connected to the auxiliary motor, is coupled to the output spindle by planetary gears. A torque signal assembly is operatively associated with the main motor and is operative upon reverse rotation of the main motor to generate a pneumatic signal indicative of such reverse rotation. Reverse rotation of the main motor is caused by the auxiliary motor when it has exerted predetermined final torque upon the threaded fastener. The fact that the main motor is axially offset from the auxiliary motor, allows the rotor of the main motor to be of smaller diameter. This, coupled with reduced speed of rotation of the reduction gear cage by reason of a spur gear coupling with the main motor output shaft, provides a reduction in kinetic energy at lower torque values without errors in torque readings because of stored energy in the rotating parts.

10 Claims, 5 Drawing Figures

TWO-SPEED OFFSET NUTRUNNER

BACKGROUND OF THE INVENTION

This invention embodies primary operational features of the tools disclosed in my two previous U.S. Pat. Nos. 3,507,173 (Apr. 21, 1970) and 3,584,694 (June 15, 1971); however, in addition, it incorporates certain structural and operational features not disclosed therein.

More particularly, the additional structural and operational features of the present invention not found in the tools of my two patents supra, can be summarized as follows:

1. The shaft that connects the dual drive planetary gearing with the output gearing does not pass through the center of the rotor of the main motor. Accordingly, the rotor can be of reduced diameter because the blades can extend further into the rotor axis since such space is not occupied by a rotor shaft, as in the case of the structure of the tools disclosed in my prior patents supra.

2. The main motor is coupled to the ring gear i.e., reduction gear cage, of a dual drive planetary gearing through spur gearing, whereby the ring gear rotates at some ratio of main motor speed, thus providing ring gear rotation at less speed than that of the main motor.

It will be apparent that features of smaller diameter rotor size, as well as the lower rotation speed of the dual drive ring gear, both contribute to a reduction in kinetic energy, thus generating lower torque values without errors in torque readings because of stored energy in the rotating parts.

BREIF DESCRIPTION OF THE DRAWINGS

DETAILED DESCRIPTION OF A PREFERRED EMBODIMENT

Figure 1A:
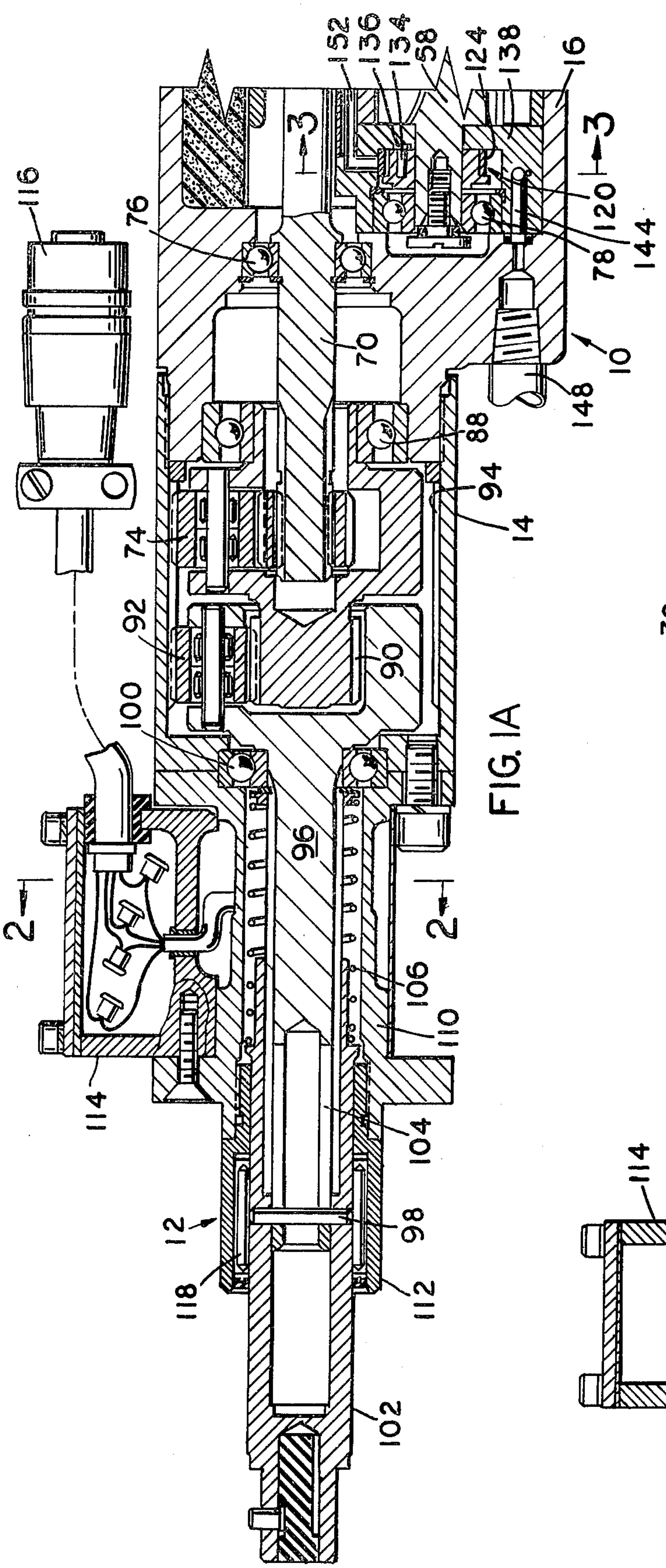
FIG. 1A is a longitudinal section through a forward half portion of a two-speed nut runner embodying the invention.
Figure 1B:
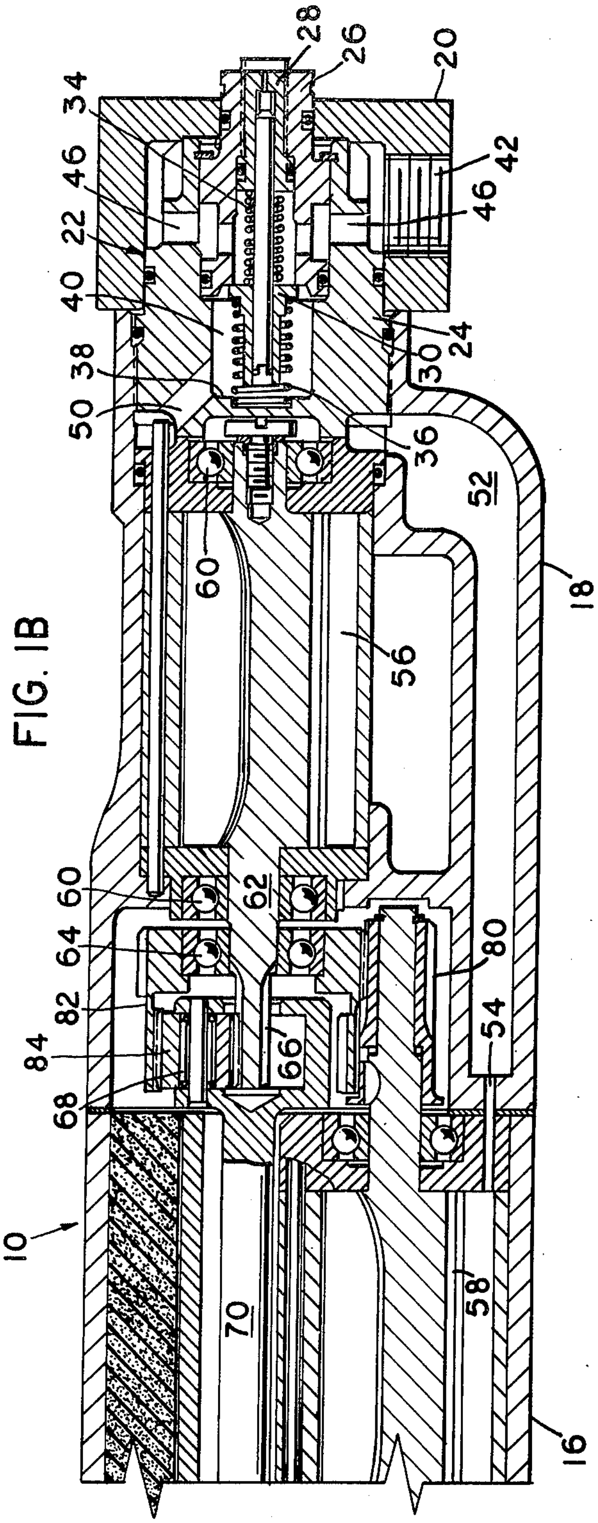
FIG. 1B is a longitudinal section through a rear half portion of the nut runner of FIG. 1A.

Referring to FIGS 1A and 1B, a tool 10 embodying the invention includes an output drive portion 12, a housing portion 14, a main motor portion 16 and an auxiliary motor portion 18, all being connected in end to end arrangement by bolt means, or threaded engagement, as shown.

The rear end of the tool is arranged for connection with a source of pneumatic pressure medium, i.e., live air, via an inlet adapter 20; other connection means, well known in the art, may of course be utilized. An adjustable pressure drop valve assemblage 22, for use in adjusting the torque level of the tool, is positioned at the extremity of the auxiliary motor portion 18. The valve assemblage 22 includes a valve housing 24, which is threadably secured to the motor portion 18, a housing regulator 26 supported within the valve housing 24 and projecting therefrom at its extremity, a valve regulator 28, i.e., adjustment screw, threadably mounted in the housing regulator 26, a valve 30 slidably supported upon a rod 32 affixed at one end within the valve regulator 28, a helical spring 34 surrounding the rod 32 and compressively arranged between the valve regulator 28 and the valve 30, and a helical spring 36 compressively arranged between the valve 30 and a wall 38 defining one end of an air chamber 40 provided within the valve housing 24.

Live air entering an inlet passage 42 formed in the adapter 20, flows through passages 44 in the housing 24 and passages 46 in the housing regulator 26, into a chamber 48 in which the helical spring 34 is located, from whence it can flow past the valve 30 into the chamber 40. The adjustment screw 28 can be set to regulate the compression on helical spring 34 which subtracts from the compressive force of helical spring 36. Live air pressure in chamber 48 unseats the valve 30 against the net force of helical springs 34 and 36, and must be greater than the air pressure in chamber 40 for such unseating to occur. The valve 30 is thus automatically controlled to maintain desired flow and pressure condition for live air being supplied to the tool rotors.

Live air is admitted to the auxiliary motor portion 18 via ports 50, and also to the main motor portion via pasageway 52 and ports 54. Positioned in the auxiliary motor portion is a vane type air motor 56 with entrance and exit ports for live air flow resulting in rotation of the motor, as is well known in the art. A vane type main motor 58 is positioned in the main motor portion 16, and is provided with inlet and outlet ports for live air flow resulting in rotation of the motor. Auxiliary motor 56, journalled at both ends in bearing means 60, has a forward shaft extension 62, a portion of which supports bearing means 64, and is formed with spur gearing 66 engageable with planetary gears 68. The planetary gears 68 are pinioned in the rear end of an intermediate spindle 70, the forward end of the spindle being formed with spur gearing 72 engageable with planetary gears 74. Bearing means 76, located in the main motor portion 16, support the forward portion of the spindle 70.

The main motor 58 is journalled at both ends in bearing means 78, the rearward end having an extension which is provided with spur gear teeth 80 arranged in engagement with external gears of a rotatable reduction gear cage 82 mounted upon the bearing means 64. Interior gears 84 of the reduction gear 82 are arranged for operative engagement with the planetary gears 68.

A forward gear cage 86 encloses the spur gearing 72, the rear end of the cage being supported in a bearing means 88, mounted in a forward end of the main motor portion 16, the forward end of the gear cage having spur gears 90 in operative engagement with planetary gears 92. The gear cage 86 supports the planetary gears 74 for rotative engagement with the spur gearing 72 as well as with spline teeth 94 formed on the interior of the housing portion 16. The spline teeth 94 also provide toothed engagement with the planetary gears 92. The latter are operatively mounted in the enlarged rear end of an output spindle 96, the forward end of which is connected by a pin 98 to a drive shank 102, while the other end is supported in bearing means 100. Longitudinal slots 104 are provided in the spindle 96 for engagement by the pin 98, the slots allowing axial movement of the drive shank 102 upon the spindle. A helical spring 106 is compressively arranged between the drive shank 102 and a retainer 108 secured to the spindle 96 whereby the drive shank is biased outwardly from the tool, but which allows for inward movement of the drive shank as may be required during work engagement operation.

A transducer element 110 surrounds the spindle 96 and is secured at its rear end to the housing portion 14 and threadably secured a spindle support piece 112 at its forward end. The transducer element electrical connections are enclosed in a terminal box 114 from which electrical signals are transmitted to a plug 116 for connection with torque monitoring means (not shown). For a more complete understanding of the operation of the transducer arrangement used on the tool of the invention, reference may be had to my U.S. Pat. No. 3,858,444 which issued on Jan. 7, 1975. A needle bearing 118 is positioned between the support piece 112 and the drive shank 102.

A torque signal assembly 120 is located on the shaft of the rotor of the main motor 58, and includes a clutch body 122 mounted eccentric on the motor shaft, and a ring 124 surrounding the clutch body and urged against the clutch body by two spriings 126. A locking ball 128 is positioned in a slot 130 formed in the clutch body and is held in contact with the rotor shaft and ring 124 by a spring 132. Mounted in the clutch body 122 is a stop pin 134, the end of which projects from the clutch body and enters a circular groove 136 formed in an end plate 138 of the main motor housing. A spring loaded ball 140 is urged into engagement with the exterior surface of the ring 124, the latter of which can force the ball to seated position in an air outlet passageway 142. The outlet passageway 142 connects with a signal port 144 which conveys live air flowing past the ball 140 into a threaded outlet 146, from whence it is led via a conduit 148 to a conduit 148 to a signal receiving device (not shown). When the ball 140 is seated to block air flow into the passageway 142, the signal port is vented to atmosphere by a bleed port 150. Live air is admitted via passageway 152 into the chamber in which the ring 124 is positioned.

Figure 3:
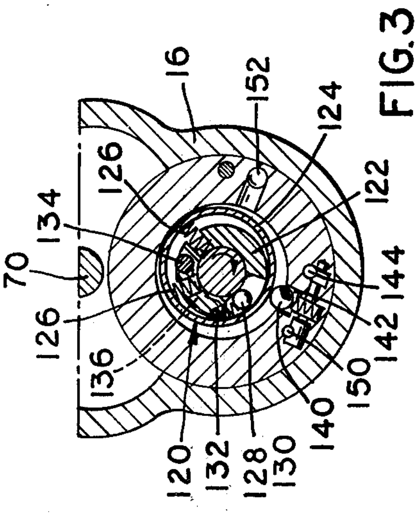
FIG. 3 is a section view as seen from line 3—3 in FIG. 1A.
Figure 2:
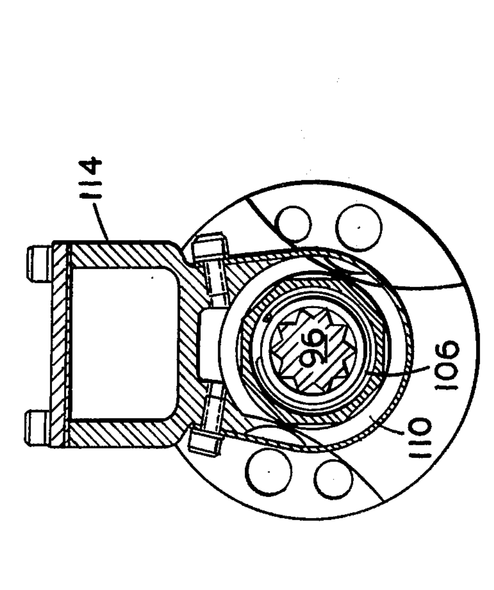
FIG. 2 is a section as seen from line 2—2 in FIG. 1A.

It will be seen that when rotor rotation is in the direction of the arrow in FIG. 3, the ball 128 skids on the rotor shaft, but when the rotation is reversed, the ball is wedged between the ring 124 and the rotor shaft thereby locking to the rotor shaft. The signal assembly rotates with the rotor shaft until the ball 128 is seated in the air outlet passageway 142. Rotation of the clutch body 122 is thus terminated; however, the ball 128 continues rotating and camming the ring 124 against the force of springs 126. When the ball contacts the end of slot 130, the rotor shaft slips relative to the ball; however, the springs 126, acting through the ring 124 upon the ball 128, develops enough frictional torque to maintain the ball 140 seated in the outlet passageway 142.

During work rundown and initial tightening phase of the tool cycle, the signal assembly 120 is as shown in FIG. 3 with the stop pin 134 in contact with the end of the groove 136. When the main motor 58 is driven backwards at completion of the tightening cycle, as will hereinafter be explained in greater detail, the clutch body 122 is locked to the rotor shaft, and the ball 140 is seated, as explained above.

In summary, during operation of the tool, the drive shank 102, which is provided with whatever work engaging socket is being used, is engaged with a fastener to be run down and set to a predetermined degree of tightness. Live air is admitted to the tool and passes through the ports 50, and into the housing of the auxiliary motor 56 to cause rotation thereof. Live air is simultaneously admitted to passageway 52 and into the housing of the main motor 58 to cause rotation thereof. Both motors rotate to drive the shank 102 clockwise and run down the workpiece.

The gear ratio of the main motor 58 relative to the spindle 70 is less than the gear ratio of the auxiliary motor 56 to the spindle which results in a high speed rundown of the fastener. The main motor 58 tightens the fastener to the limit of its capacity and then stalls. The auxiliary motor 56 continues tightening the fastener until the main motor 58 is unable to hold the reduction gear 82 from turning. The spindle 96 then stops rotating and all rotation of the auxiliary motor 56 is absorbed by reverse rotation of the main motor 58. However, the torque developed to force reverse rotation of the main motor is still being exerted upon the fastener, hence, if there is a drop in torque value by the fastener because of work condition, the main motor 58 would stop reverse rotation and the spindle 96 would again be rotated to set the fastener at predetermined torque.

Once this condition is achieved, the torque signal assembly 120 would be caused to operate, as described above, and a torque completion signal would be transmitted to a signal reception means which would terminate tool operation by cut-off of live air flow on the tool motors.

Figure 4:
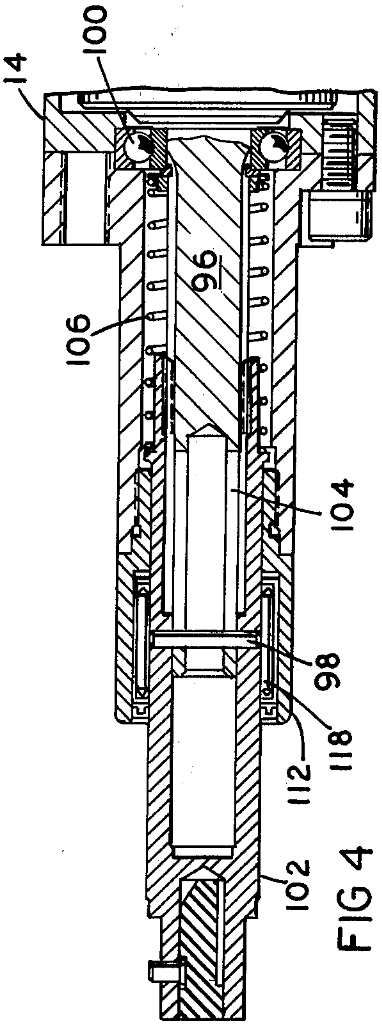
FIG. 4 is a longitudinal section of an output drive assembly which does not have a torque transducer means as illustrated in the tool of FIG. 1A.

If a tool without a transducer element 110 is desired, as in the case wherein monitoring of torque values developed during tool operation is not essential, the arrangement illustrated in FIG. 4 may be employed. In such an arrangement, it will be seen that a spindle housing 152 may be affixed to the housing portion 14, which housing 152 is devoid of a torque transducer element. Such a tool would, of course, employ all the other elements described in connection with the tool 10.

It is pointed out that the tool 10 disclosed herein, is one that would be used in tandem with a plurality of like tools for gang operation on workpieces, such as running down wheels on automobiles, etc. In such an arrangement, all tightening operations would have to reach predetermined torque value before live air to all such tools was interrupted. However, the tool could be arranged for singular operation, i.e., not in tandem, in applications where appropriate.

I claim:

1. A two-speed pneumatically powered rotary nut runner including an output spindle adapted for rotation of a drive shank engageable with a threaded fastener, an auxiliary motor, a main motor axially offset from the auxiliary motor and being drivingly connected thereto by a rotatable reduction gear cage the rotational speed of the cage being less than that of the main motor, an intermediate spindle drivingly connected to the auxiliary motor, and a forward gear cage enclosing planetary gearing interconnecting the intermediate spindle to the output spindle.

2. A two-speed pneumatically powered rotary nut runner according to claim 1, wherein a torque signal assembly is operatively associated with the main motor, said torque signal assembly being operative upon reverse rotation of the main motor to generate a pneumatic signal indicative of such reverse rotation.

3. A two-speed pneumatically powered rotary nut runner according to claim 2, wherein a transducer element is mounted adjacent the output spindle to monitor the torque exerted by the spindle upon a workpiece being tightened.

4. A two-speed pneumatically powered rotary nut runner according to claim 2, wherein said reduction gear cage is supported upon a bearing means mounted upon a shaft extension of the auxiliary motor, and has interior gears engageable by planetary gears which are pinioned in a rear end of the intermediate spindle.

5. A two-speed pneumatically powered rotary nut runner according to claim 4, wherein the forward gear cage is supported in bearing means mounted in the forward end of a main motor portion, the forward end of the gear cage being formed with spur gears in operative engagement with planetary gears pinioned in an enlarged rear end of the output spindle, and a housing portion surrounding the forward gear cage.

6. A two-speed pneumatically powered rotary nut runner according to claim 5, wherein th intermediate spindle is provided with spur gears at the forward end, which are in operative engagement with planetary gears pinioned in the forward gear cage.

7. A two-speed pneumatically powered rotary nut runner according to claim 6, wherein the housing portion surrounding the forward gear cage is provided with interior spline teeth in operative engagement with the planetary gears pinioned in the forward gear cage as well as with the planetary gears pinioned in the enlarged rear end of the output spindle.

8. A two-speed pneumatically powered rotary nut runner according to claim 7, wherein the main motor and the auxiliary motor are served by a common pressurized medium source, said main motor having a stall torque less than that of the auxiliary motor whereby the auxiliary motor is operative to deliver predetermined final work setting torque.

9. A two-speed pneumatically powered rotary nut runner according to claim 8, wherein when the auxiliary motor attains predetermined final work setting torque further rotation thereof causes a reverse rotation of the main motor.

10. A two-speed pneumatically powered rotary nut runner according to claim 9, wherein the torque signal assembly includes a clutch body mounted eccentric on the shaft of the main motor, a ring surrounding the clutch body and urged thereagainst by spring means, and a spring loaded ball which is forced by the ring into seating engagement with an air outlet passageway, when the clutch body is rotated by the main motor operating in reverse direction to cut off flow of pneumatic medium in the air outlet passageway thereby generating a signal indicative that predetermined torque has been exerted upon the workpiece.

* * * * *